Feb. 11, 1947.   C. B. BEUSCHEL   2,415,669
WIRE STRIPPING APPARATUS
Filed May 2, 1944   2 Sheets-Sheet 1
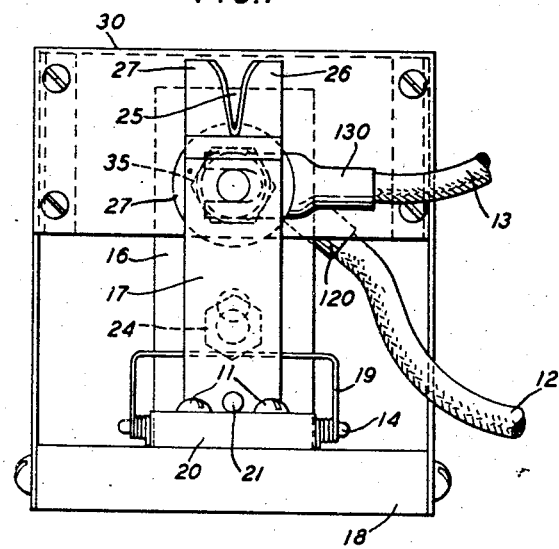
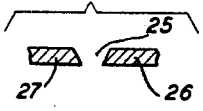
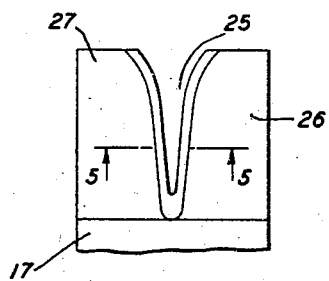
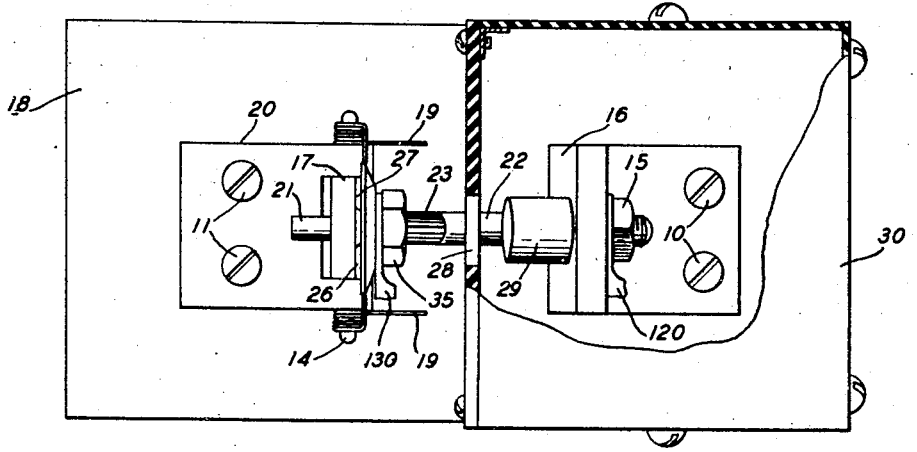
INVENTOR
C.B. BEUSCHEL
BY
E.R. Nowlan
ATTORNEY Feb. 11, 1947. C. B. BEUSCHEL 2,415,669
WIRE STRIPPING APPARATUS
Filed May 2, 1944 2 Sheets-Sheet 2
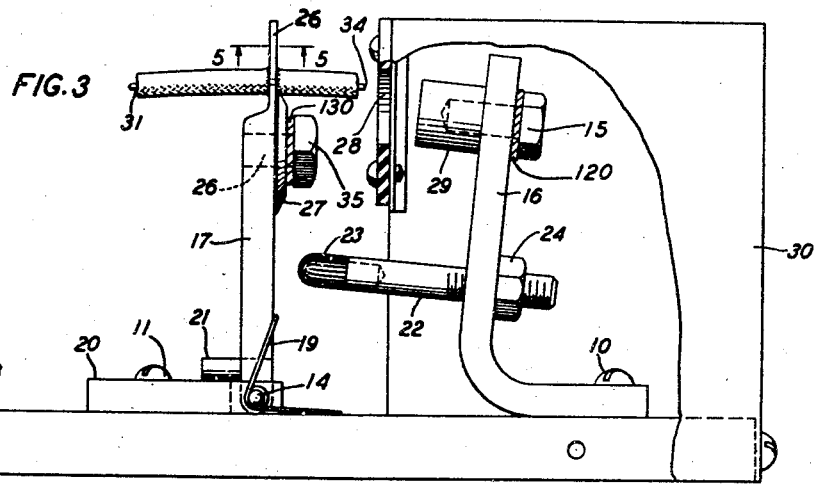
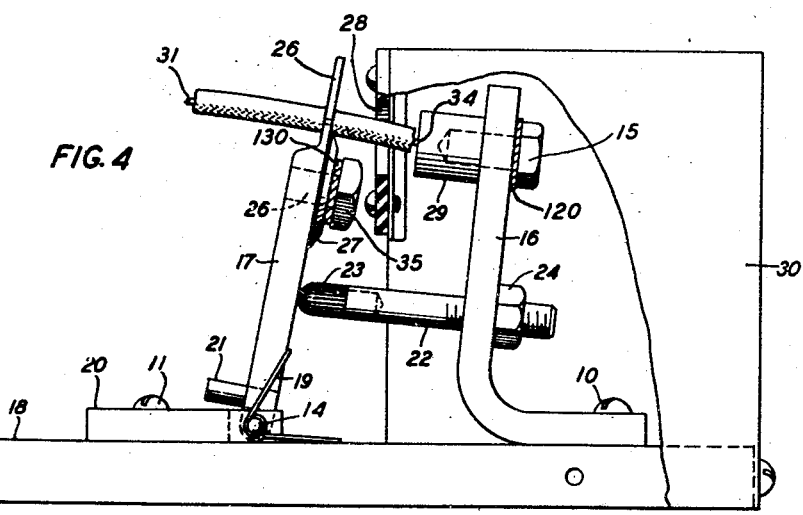
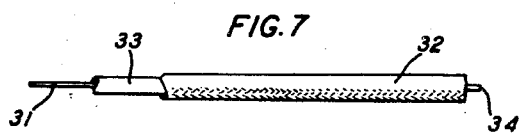
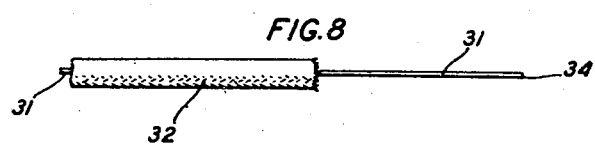
INVENTOR
C. B. BEUSCHEL
BY
E. R. Nowlan
ATTORNEY Patented Feb. 11, 1947

2,415,669

UNITED STATES PATENT OFFICE 2,415,669

WIRE STRIPPING APPARATUS

Clemens B. Beuschel, Queens Village, N. Y., assignor to Western Electric Company, Incorporated, New York, N. Y., a corporation of New York Application May 2, 1944, Serial No. 533,810

4 Claims. (Cl. 81—9.51)

This invention relates to an apparatus for stripping strands, and more particularly to an apparatus for stripping insulation from electrical conductors.

There have been several problems in the removal of insulation such as molded rubber insulation, which is more or less adherent to the wire, by scraping with a knife or other edged tool. This is a tedious chore, and where it has to be done many times, as in the assembly of many kinds of electrical apparatus where numerous connecting wires must be thus stripped at both ends before being put in place, becomes importantly time consuming.

An object of the invention is to provide a simple, convenient and reliable device for positively stripping heat softenable insulation from a predetermined portion of an insulated conductor wire.

With the above and other objects in view, the invention may be embodied in a device for removing insulation from an end portion of a metal conductor wire insulated with a sheath comprising a layer of heat softenable material in contact with the wire, the said device comprising a stationary contact member connectible to one side of an electric circuit, a contact member movable toward and from the stationary member and connectible to the other side of the electric circuit, and means on the movable contact to cut through the insulation of an insulated wire and to make electrical contact of the wire with the movable contact, the parts being so proportioned and arranged that motion of the movable contact with a wire held in the cutting means thereon toward the stationary contact will bring the end of the wire into contact with the stationary contact to heat the portion of wire between the two contacts to soften the insulation thereon to enable the wire to be withdrawn therefrom.

Further objects and features of the invention will be apparent from the following detailed description of an embodiment thereof, taken in connection with the accompanying drawings, wherein the same reference numerals are applied to identical parts in the several figures, and wherein Fig. 1 is a view in end elevation of an apparatus embodying the invention;

Fig. 2 is a plan view thereof with parts broken away;

Fig. 3 is a side elevation thereof with parts broken away and a piece of insulated wire added;

Fig. 4 is a view similar to Fig. 3 with parts in another position;

Fig. 5 is an enlarged section on the line 5—5 of Figs. 3 and 6;

Fig. 6 is a detached face view of the completed showing of Fig. 5;

Fig. 7 is a detached view of a piece of insulated wire to have a portion at one end stripped of insulation; and Fig. 8 shows the wire stripped.

The embodiment of the invention herein illustrated comprises a tabular, slab-like base 18 of rigid electrically insulating material, e. g., a suitable artificial resin plastic such as Bakelite, or hard rubber, hard fiber, wood, porcelain, or the like. A rigid bracket 16 is mounted on this base with screws 10. The upright arm of this bracket is preferably, though not necessarily, slanted back a little as shown, the two arms of the bracket being at somewhat less than a right angle to each other. Near the upper end of the bracket a metal contact member 29, preferably of copper or other high conductivity material, is mounted by means of a screw 15.

Facing the bracket 16 is an upstanding support post 17 pivotally mounted on a shaft 14 in a block 20 which is secured on the base 18 by screws 11. The post 17 is tiltable toward and from the upright of the bracket 16 and is urged away from the latter by a coil spring 19, while a stop pin 21 mounted in the post limits this motion of the post to the position shown in Fig. 3. The forward tilting of the post 17 toward the bracket 16 is limited by a threaded stop member 22 mounted in a correspondingly threaded bore in the bracket 16 and adjustably locked in place by a jam nut 24. The outer end of the member 22 which is designed to make contact against the post 17 when the latter has been tilted forward against the urge of the spring 19 to a desired position, is furnished with a tip 23 of some suitable insulating material, e. g., hard rubber, hard fiber, Bakelite, or the like.

The screw 15 besides serving to hold the contact member 29 in place on the bracket 16, may also serve to secure on the bracket 16 and in electrical communication with the member 29 the terminal 120 of an electrical supply cable 12. Similarly, the terminal 130 of another cable 13 is secured to the post 17 and in electrical communication therewith by a screw 35. The cables 12 and 13 are connected to any suitable source (not shown) of low voltage, high amperage, electric current.

The upper end of the post 17 is formed bifurcate, as shown, with a vertical slot 25, between rigid stripping jaws 26 and 27. The slot 25 is tapered in cross-section, as best shown in Fig. 5, to provide cutting edges on the opposed edges of the jaws 26 and 27. The slot 25 is also tapered from top to bottom, as best shown in Fig. 6, to allow the device to be used for stripping wires of various gauges.

Preferably a casing 30 is mounted on the base 18, as shown, to protect an operator's eyes from the intense flash of arcs or sparks, when the device is used. In such case the casing will have a small aperture 28 to give access to the contact 29.

Let it now be assumed that a piece of wire 31 (Fig. 7) is to have a portion of its right end stripped of both the textile braid 32 over molded rubber 33 with which the wire is insulated. With the parts of the device in the position shown in Fig. 3, the wire is forced transversely down into the slot 25, with the cutting edges of the jaws 26 and 27 at the required distance from the right end of the wire 31, until the jaw edges just make contact with the metal of the wire. The wire is then rotated until the combined braid and rubber insulation is cut through circumferentially of the wire. The post 17 is then tilted forward until the exposed tip 34 of the wire makes contact with the member 29, and the heavy current from the cables 12 and 13 passes through the wire 31 and heats this to a point where the inmost portion of the insulating sheath 33 is melted or sufficiently softened so that a light pull on the outer part of the wire at the left (Fig. 4) of the jaws 26 and 27, draws the portion of the wire at the right of the jaws out of the cut off section of insulation about it. Done in this manner, the stripping of one end of a wire having molded insulation thereon, becomes a matter of only a few seconds.

What is claimed is:

1. A device for removing insulation from an end portion of a metal conductor wire insulated with a sheath comprising a layer of heat softenable material in contact with the wire, the said device comprising a base, a stationary contact member rigidly mounted on the base, means to connect the said member to one side of an electric circuit, a contact member pivotally mounted on the base to be tiltably movable toward and from the stationary member, means to connect said tiltable member to the other side of the electric circuit, and means on the movable contact member to cut through the insulation of an insulated wire and to make electrical contact of the wire with the movable contact member, the parts being so constructed and arranged that motion of the movable contact member with a wire held in the cutting means thereon toward the stationary contact member will bring the end of the wire into contact with the stationary contact member to cause current to pass through and to heat the portion of wire between the two contact members to soften the insulation thereon to enable the wire to be withdrawn therefrom while the severed portion of the insulation is retained by the cutting means against withdrawal.

2. A device for removing insulation from an end portion of a metal conductor wire insulated with a sheath comprising a layer of heat softenable material in contact with the wire, the said device comprising a base, a stationary contact member rigidly mounted on the base, means to connect the said member to one side of an electric circuit, a contact member pivotally mounted on the base to be tiltably movable toward and from the stationary member, means to connect said tiltable member to the other side of the electric circuit, and sharp edged jaws on the movable contact member to cut through the insulation of an insulated wire and to make electrical contact of the wire with the movable contact member, the parts being so constructed and arranged that motion of the movable contact member with a wire held in the jaws thereon toward the stationary contact member will bring the end of the wire into contact with the stationary contact member to cause current to pass through and to heat the portion of wire between the two contact members to soften the insulation thereon to enable the wire to be withdrawn therefrom while the severed portion of the insulation is retained by the jaws against withdrawal.

3. A device for removing insulation from an end portion of a metal conductor wire insulated with a sheath comprising a layer of heat softenable material in contact with the wire, the said device comprising a base, a stationary contact member rigidly mounted on the base, means to connect the said member to one side of an electric circuit, a contact member pivotally mounted on the base to be tiltably movable toward and from the stationary member, means to connect said tiltable member to the other side of the electric circuit, and sharp edged jaws on the movable contact member to cut through the insulation of an insulated wire and to make electrical contact of the wire with the movable contact member, the parts being so constructed and arranged that motion of the movable contact member with a wire held in the jaws thereon toward the stationary contact member will bring the end of the wire into contact with the stationary contact member to cause current to pass through and to heat the portion of wire between the two contact members to soften the insulation thereon to enable the wire to be withdrawn therefrom while the severed portion of the insulation is retained by the jaws against withdrawal, in combination with stop means to limit the motion of the movable contact member toward and from the stationary contact member.

4. A device for removing insulation from an end portion of a metal conductor wire insulated with a sheath comprising a layer of heat softenable material in contact with the wire, the said device comprising a base, a stationary contact member rigidly mounted on the base, means to connect the said member to one side of an electric circuit, a contact member pivotally mounted on the base to be tiltably movable toward and from the stationary member, means to connect said tiltable member to the other side of the electric circuit, and sharp edged jaws on the movable contact member having sharp edges thereon to cut through the insulation of an insulated wire and to make electrical contact of the wire with the movable contact member, the parts being so constructed and arranged that motion of the movable contact member with a wire held in the jaws thereon toward the stationary contact member will bring the end of the wire into contact with the stationary contact member to cause current to pass through and to heat the portion of wire between the two contact members to soften the insulation thereon to enable the wire to be withdrawn therefrom while the severed portion of the insulation is retained by the jaws against withdrawal, in combination with means to urge the movable contact member resiliently away from the stationary contact member and stop means to limit the motion of the movable contact member toward and from the stationary contact member.

CLEMENS B. BEUSCHEL.

REFERENCES CITED

The following references are of record in the file of this patent:

UNITED STATES PATENTS

| Number | Name | Date |
| --- | --- | --- |
| 1,351,186 | Nelson | Aug. 31, 1920 |
| 1,595,793 | Levinger et al. | Aug. 10, 1926 |
| 2,291,862 | Bailey | Aug. 4, 1942 |
| 2,192,056 | Watts | Feb. 27, 1940 |

FOREIGN PATENTS

| Number | Country | Date |
| --- | --- | --- |
| 426,544 | British | Apr. 4, 1935 |